(No Model.)

W. W. WRIGHTSON.
SUBMARINE TELESCOPE.

No. 260,726.    Patented July 4, 1882.

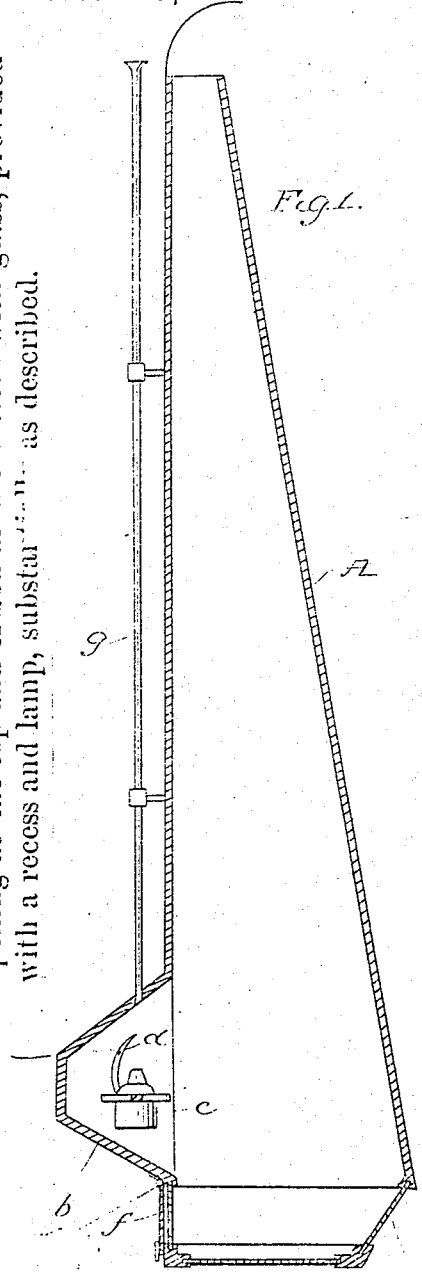

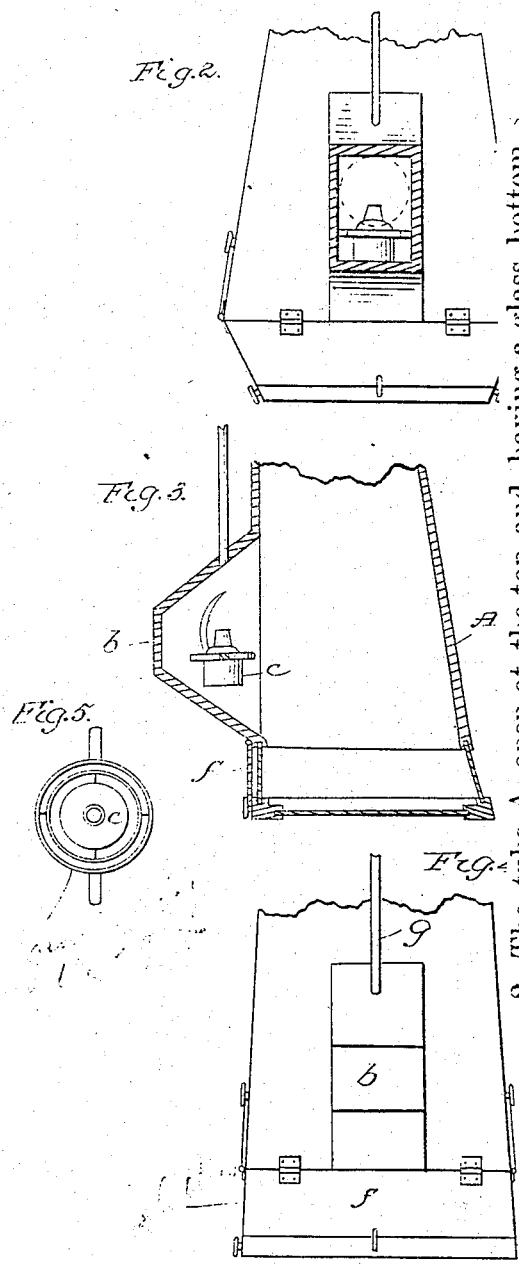

260,726. SUBMARINE TELESCOPE. WILLIAM W. WRIGHTSON, Baltimore, Md., assignor of one-half to Thomas S. Wrightson, same place. Filed Mar. 28, 1882. (No model.)

*Claim.*—1. An apparatus for inspecting the bottoms of rivers, harbors, or other bodies of water, consisting of a tube having an opening at the top and closed at the bottom with glass, provided with a recess and lamp, substantially as described.

2. The tube A, open at the top and having a glass bottom, the vertical glass back, and the inclined glass sides, substantially as described.

3. The tube A, having a glass bottom and glass sides, the hinged shutters, and the lamp placed in a recess, substantially as described.

Attest:
F. L. Middleton
Walter Drainson

Inventor
William Wirt Wrightson
by Ellis Spear
atty

UNITED STATES PATENT OFFICE.

WILLIAM W. WRIGHTSON, OF BALTIMORE, MARYLAND, ASSIGNOR OF ONE-HALF TO THOMAS S. WRIGHTSON, OF SAME PLACE.

SUBMARINE TELESCOPE.

SPECIFICATION forming part of Letters Patent No. 260,726, dated July 4, 1882.

Application filed March 28, 1882. (No model.)

*To all whom it may concern:*

Be it known that I, WILLIAM W. WRIGHTSON, of Baltimore, in the State of Maryland, have invented a new and useful Improvement in Submarine Telescopes; and I do hereby declare that the following is a full, clear, and exact description of the same.

My invention relates to the exploration of the bottom of rivers, harbors, and other bodies of water.

The object of the invention is to enable the observer to see any object upon or near the bottom from any convenient position above the surface.

The invention consists substantially of a tube or tubular structure having an opening at the top for the observer to look in at, but closed at the bottom with glass, and preferably with a lamp placed in a recess, and with a special arrangement of the devices at the sides, whereby light is thrown upon the bottom and the observer at the top is enabled to see the bottom, or any objects upon or near it.

In carrying out my invention, I prefer to use a lamp set in a recess in one side of the tube or tubular structure, with a tube for the escape of the smoke of the lamp, if an ordinary lamp is used, and with glass at the bottom and around the sides near the bottom.

I have hereinafter described the best mode known to me of carrying out the principle of my invention as above stated, and have shown the same in the accompanying drawings.

In these drawings, Figure 1 represents a vertical central section of the apparatus. Fig. 2 shows a back view of part of the same. Fig. 3 shows a like section of a modified form of the lower part of the apparatus, and Fig. 4 represents a back view of Fig. 3. Fig. 5 is a detail view of method of mounting the lamp.

In these drawings, A represents a tubular structure, made slightly tapering from bottom to top. The top of this may be of any convenient size for the use of the operator in looking in to observe the bottom, and is preferably covered with a hood, which incloses the head and shuts out the light around the eyes of the observer.

The tube may be either round, square, or polygonal, and should be, of course, water-tight.

As shown in the drawings, one side, which I have called the "back," is made straight from top to bottom. Near the bottom on this side I place a water-tight box, which forms a recess in the back of the apparatus, preferably made flaring and opening into the interior of the tube. In this box (marked *b*) I place a lamp, *c*, behind which is a reflector, *d*, adapted to throw light downward toward the bottom. It is obvious that the box or recess must be of such size as to hold the lamp and conceal it from the view of the observer looking through the opening in the top.

Preferably I mount the lamp upon a pivot, so that it can be adjusted in position by tipping it forward more or less in order to bring the light at greater or less angle to the bottom. In order to maintain the same relative position of the reflector to the lamp, I fix the reflector either directly to the lamp or to the standard which supports the lamp, as shown in Fig. 5.

In order that the lamp and the reflector may always stand in a vertical position, whatever the inclination of the tube, I prefer to suspend the lamp in ordinary gimbal-joints, or by like means, so that it may have universal motion, the lamp being suspended so that the greater weight will be below the pivot, or, if necessary, the bottom part of the lamp may be made thicker and heavier for that purpose. This construction is shown more in detail in Fig. 5.

The bottom of the tube, as shown in Figs. 1 and 2, is made with the three sides inclined, and these inclines and the back below the lamp-box are made of glass, set in any suitable frame-work or sash made strong enough to bear the pressure of the water outside. The bottom is also made of glass, and this glass, as well as the glass about the sides, must be also strong enough to resist the pressure of the water.

The position of the reflector, as before stated, is such as to throw the light of the lamp upon the bottom.

Instead of the inclined sides, as shown in Figs. 1 and 2, I may continue all the sides in the same plane, as shown in Figs. 3 and 4; but I prefer the construction first shown.

In case I desire to confine the light to one side, I have provided shutters *f f f* for the back and the two sides on each side of the lamp, by means of which both those two sides and the back may be darkened and all the light thrown only through the glass opposite the lamp. These shutters, when not in use to close the glass upon any one of the sides, may be swung up and attached to the sides of the tube by means of buttons or hooks, or in any convenient way. The shutters may be made of any kind of suitable material.

The tube for carrying off the smoke is attached to the back, as shown at *g*. It enters the recess or box in which the lamp is located and extends up to the top. It may be made of ordinary gas-pipe or any other suitable material, it being required only that it should be water-tight and have water-tight connection with the lamp-box.

Any suitable weights may be attached to the lower end of the tube in order to sink it in the water.

The apparatus, as above described, may be used from a boat, raft, wharf, or any suitable standing-place, in any depth or kind of water, whether clear or muddy, through which the tube can extend.

In order to adapt the apparatus for different depths of water, I may make it extensible, either by adding sections with water-tight joints between, or by making the tube with telescoping parts, so that the upper parts may be drawn out in order to elongate it.

The apparatus may also be used as a moving device for searching upon the bottom by mounting it upon a boat. For this purpose it may be mounted upon the stem of the boat by means of a rack-bar fixed to the tube up and down the back thereof, and a pinion may be provided upon the boat, with a crank for turning the same, the pinion meshing into the gear, any suitable guides being provided for holding the apparatus and keeping the rack in gear with the pinion; or the apparatus may be held to the boat and raised or lowered in any other convenient way.

I have shown an ordinary lamp for giving the necessary light at the bottom; but it will be obvious that any well-known lighting apparatus may be used, such as an electric lamp, the wires therefor being run down within the tube, or attached thereto, and connected with any suitable generator above.

Where the water is reasonably clear the apparatus may also be used with good effect, without the aid of artificial light, by inclining the apparatus so that the rays of the sun will strike the vertical glass on the back, through which glass it is reflected upon the bottom.

The lamp, instead of being fixed in the recess, may be attached to the end of a rod, so that it may be lowered into place or removed therefrom while the tube is in the water.

Having thus described my invention, what I claim is—

1. An apparatus for inspecting the bottoms of rivers, harbors, or other bodies of water, consisting of a tube having an opening at the top and closed at the bottom with glass, provided with a recess and lamp, substantially as described.

2. The tube A, open at the top and having a glass bottom, the vertical glass back, and the inclined glass sides, substantially as described.

3. The tube A, having a glass bottom and glass sides, the hinged shutters, and the lamp placed in a recess, substantially as described.

4. The tube A, provided with a recess, a suitable lamp placed therein, and the smoke-tube extending to the top, substantially as described.

In testimony whereof I have signed my name to this specification in the presence of two subscribing witnesses.

WILLIAM WIRT WRIGHTSON.

Witnesses:
 CHARLES W. STONE,
 JOHN THOS. WRIGHTSON.